No. 810,377. PATENTED JAN. 16, 1906.
J. H. McCORMICK & J. D. MORRISON.
CASH REGISTER AND INDICATOR.
APPLICATION FILED NOV. 29, 1905.
10 SHEETS—SHEET 2.
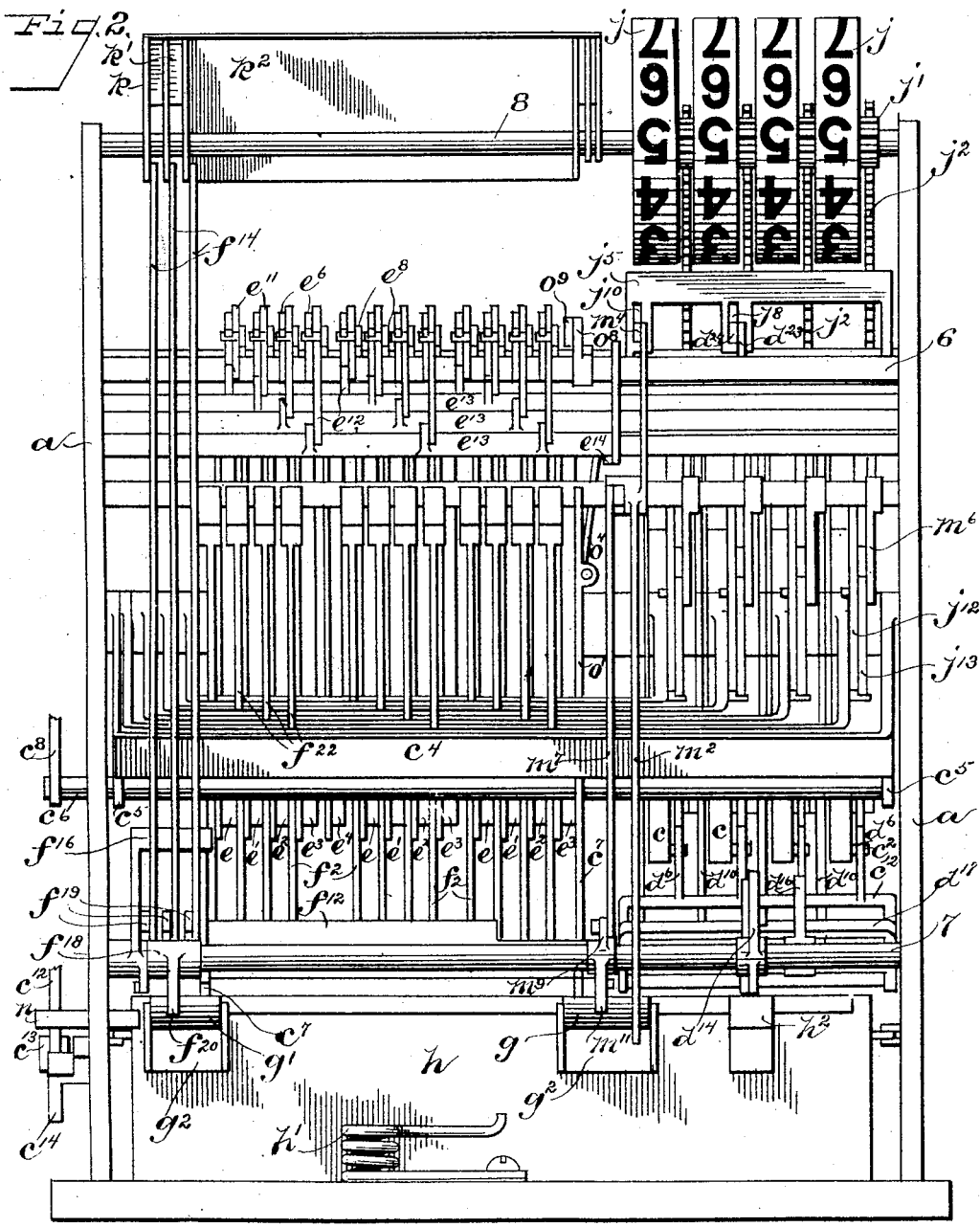

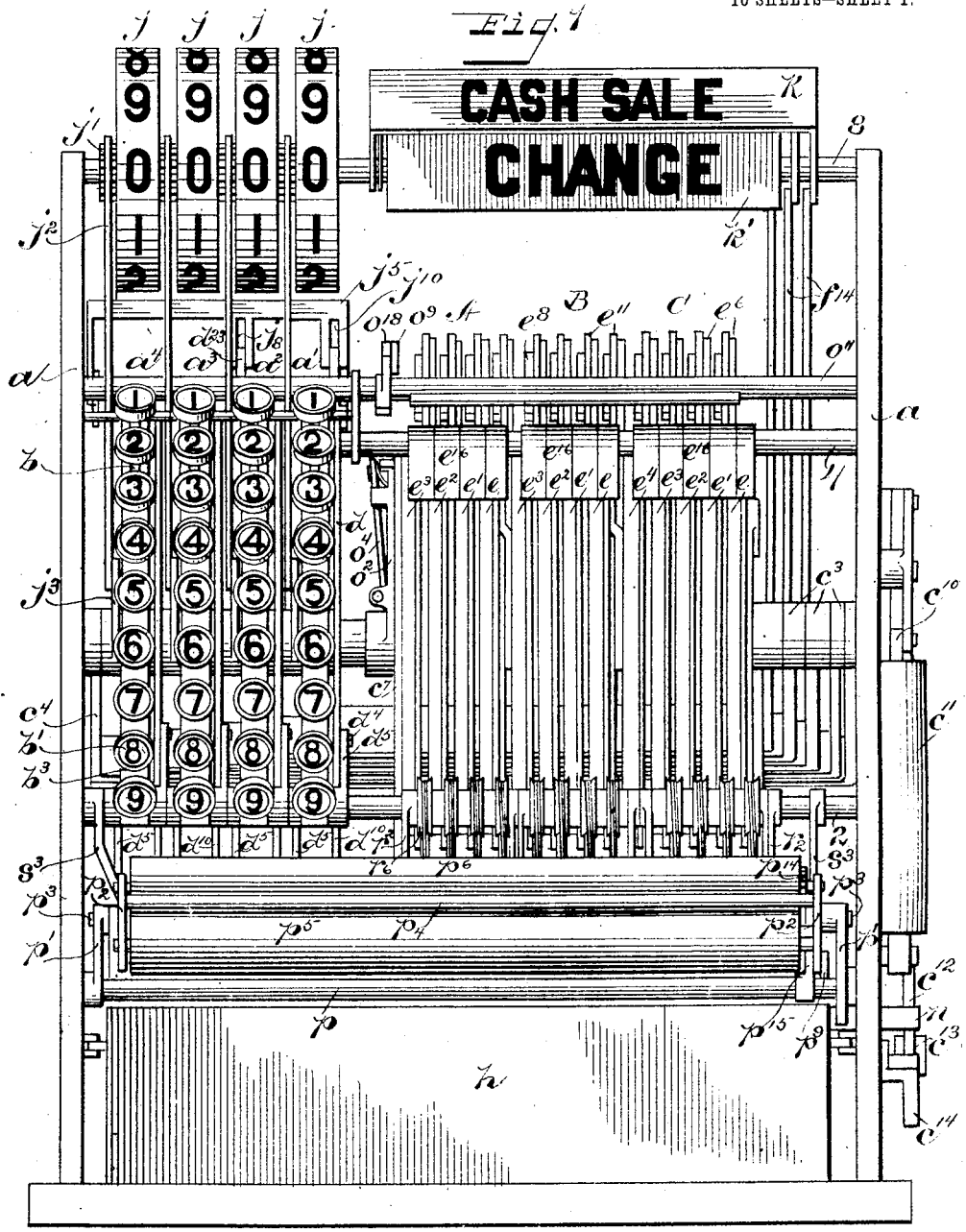

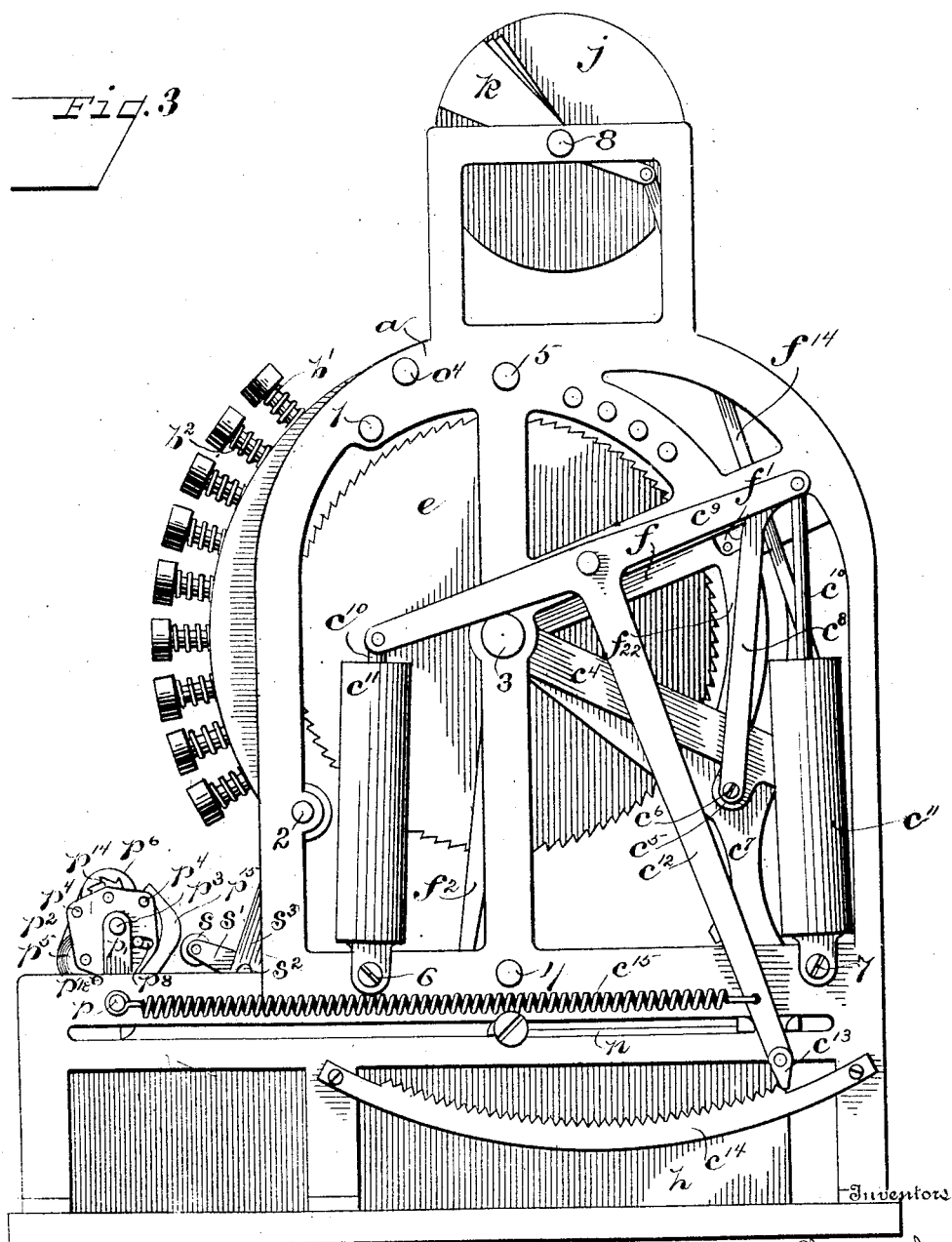

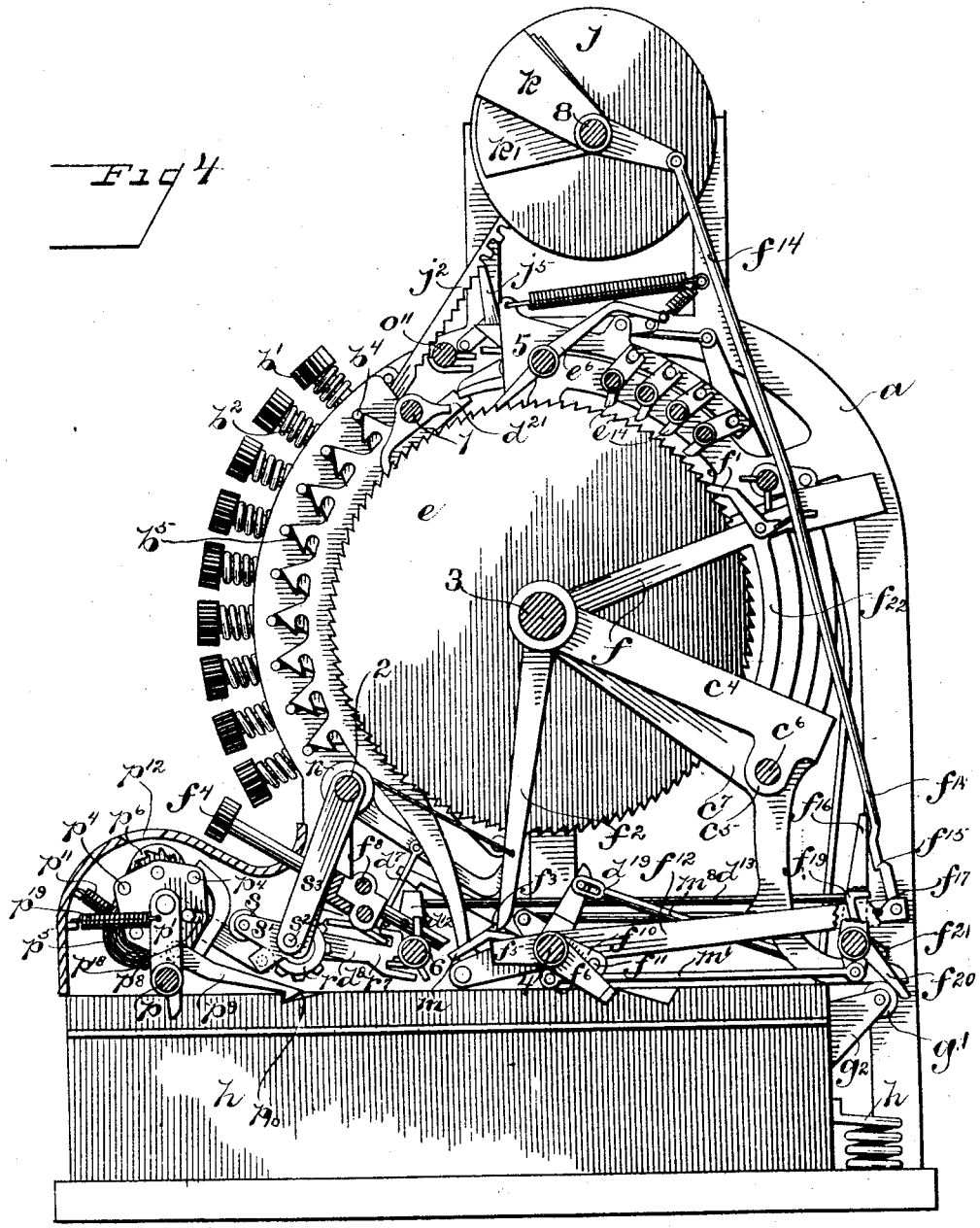

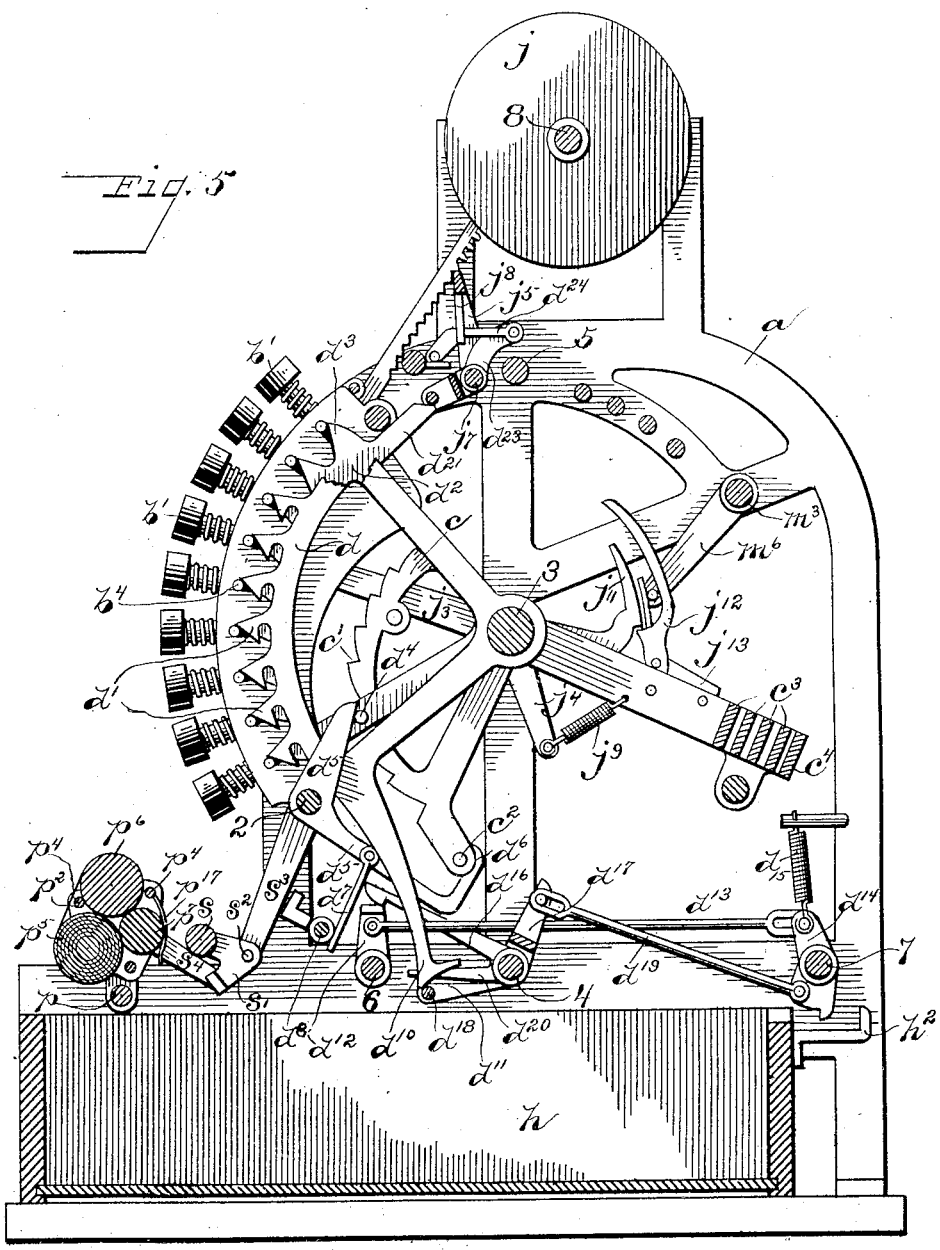

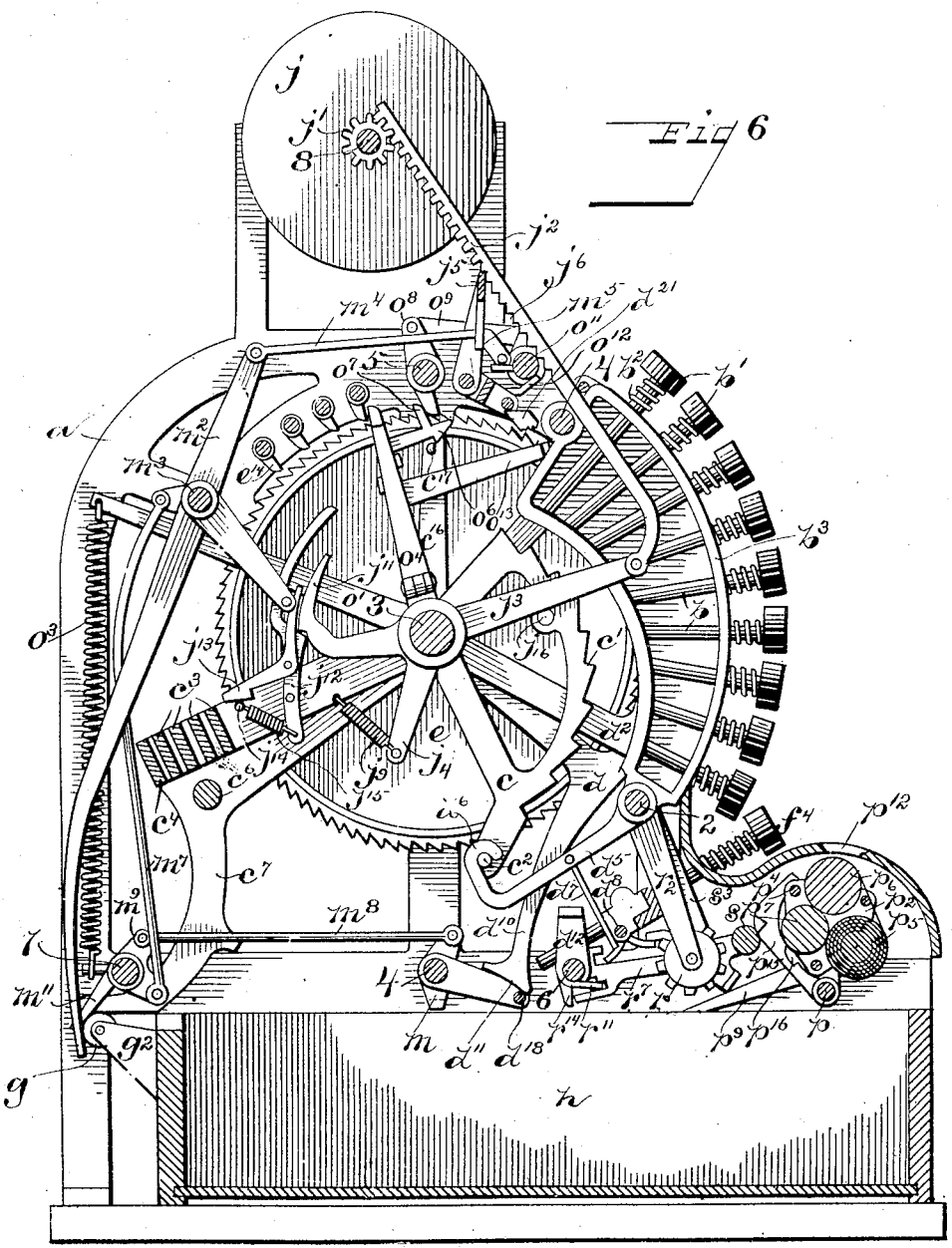

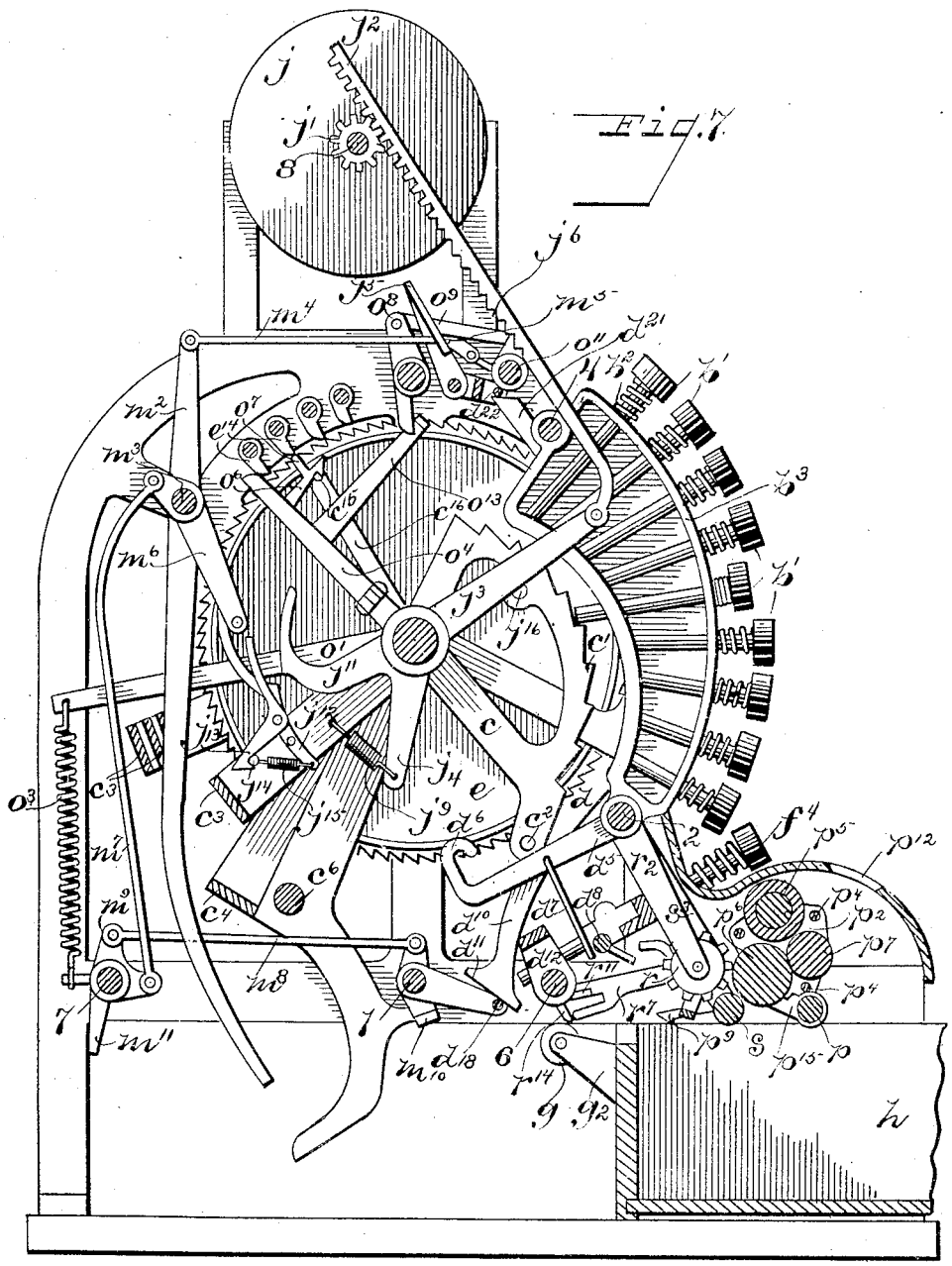

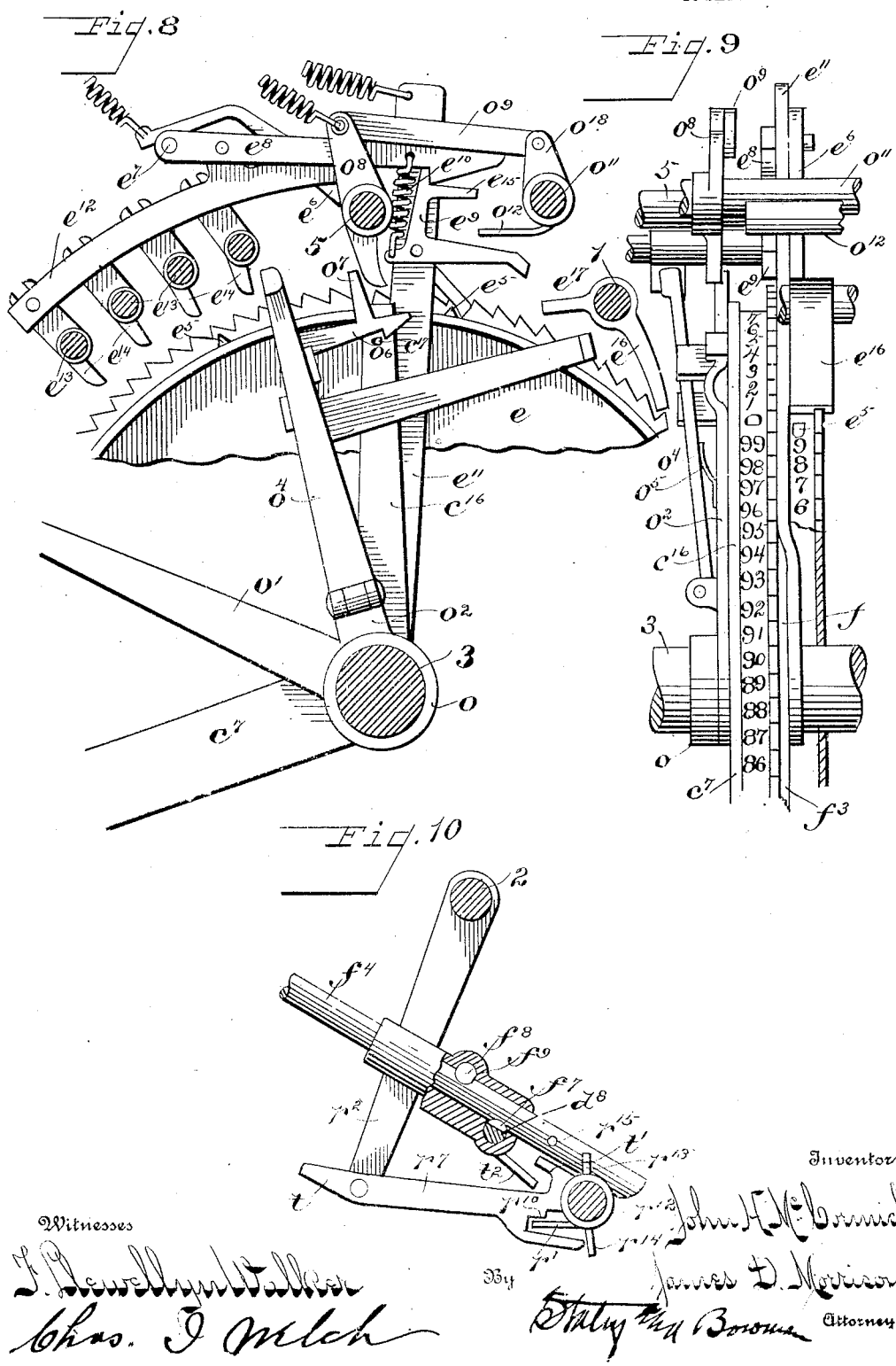

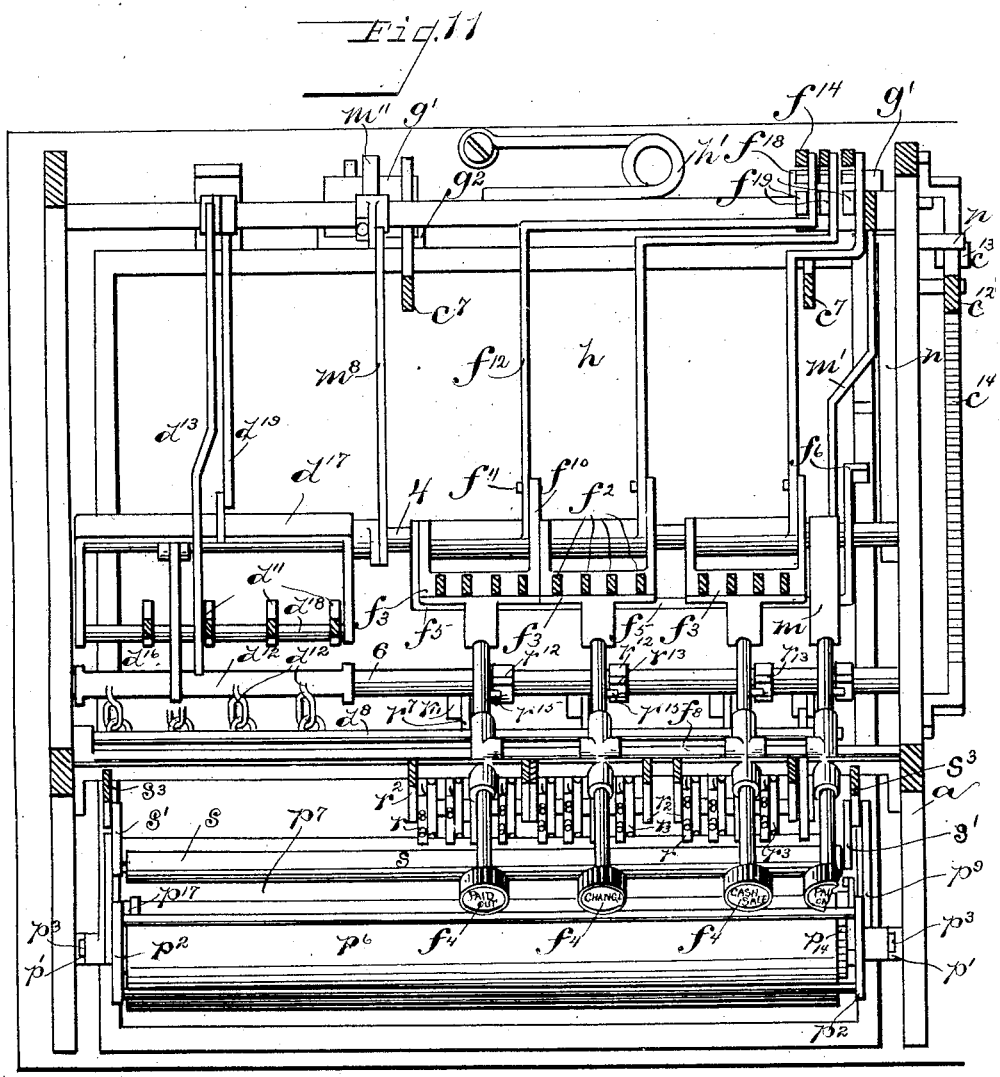

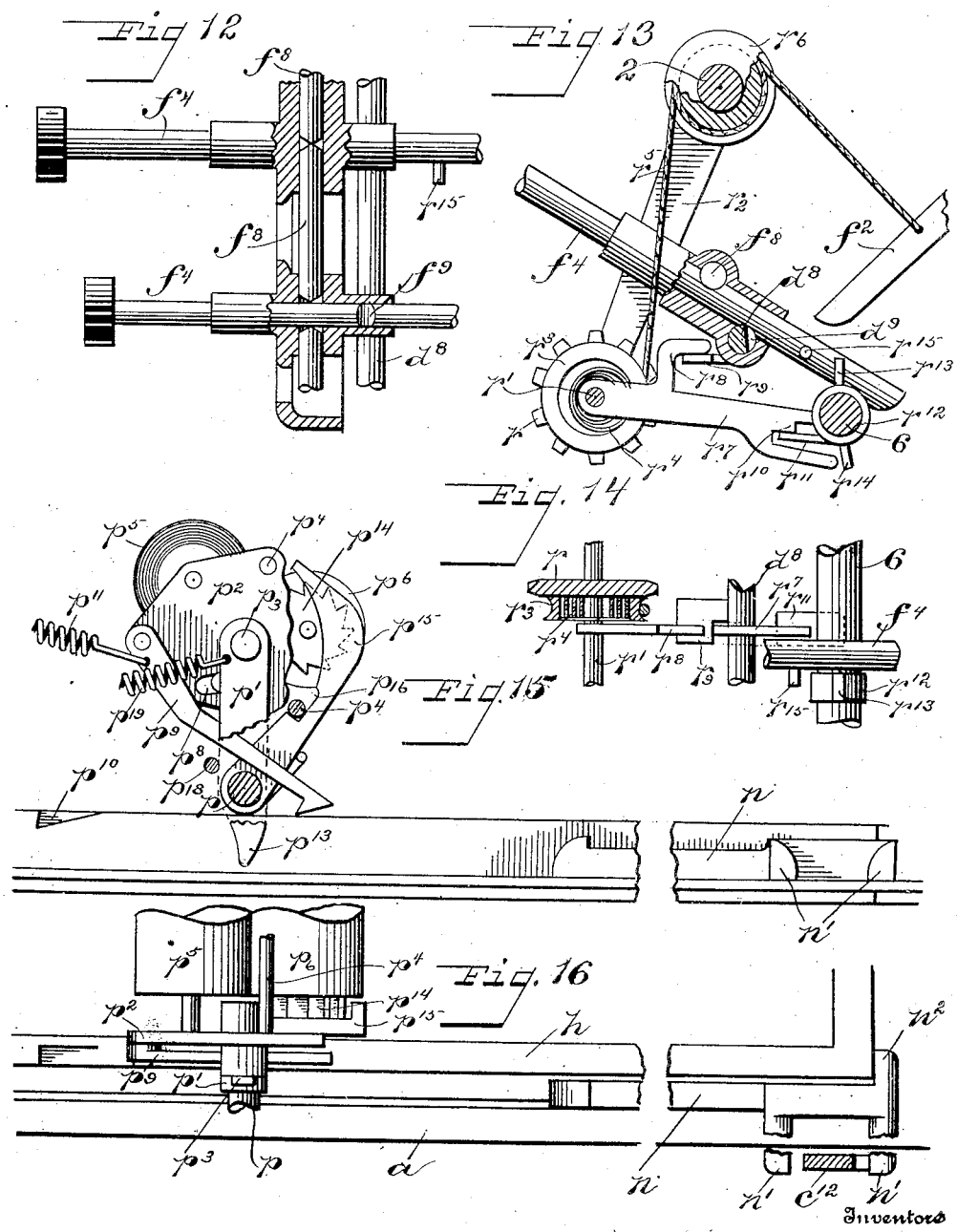

UNITED STATES PATENT OFFICE.

JOHN H. McCORMICK, OF COLUMBUS, OHIO, AND JAMES D. MORRISON, OF WASHINGTON, DISTRICT OF COLUMBIA.

CASH REGISTER AND INDICATOR.

No. 810,377.      Specification of Letters Patent.      Patented Jan. 16, 1906.

Original application filed April 5, 1895, Serial No. 544,583. Divided and this application filed November 29, 1905. Serial No. 289,626.

*To all whom it may concern:*

Be it known that we, JOHN H. MCCORMICK, residing at Columbus, Franklin county, Ohio, and JAMES D. MORRISON, residing at Washington, in the District of Columbia, citizens of the United States, have invented certain new and useful Improvements in Cash Registers and Indicators, of which the following is a specification.

Our invention relates to improvements in cash registers and indicators, the present application being a division of our application, Serial No. 544,583, filed April 5, 1895; and it relates particularly to that class of cash-registers in which a single keyboard is adapted to control the registering devices, which, while operated by a common actuating device, are nevertheless independent so far as the registration of the amounts therein is concerned. The particular invention illustrated and described in this divisional application, however, is capable of use with registers of different types, as will more clearly appear hereinafter.

In the machine shown in the present application means are provided for printing as well as registering certain transactions, and one of the objects of the invention is to provide an improved form of printing mechanism and the connections therefor.

A further object of the invention is to provide an improvement in the indicator and means for operating the same.

A further object of the invention is to provide improved means for effecting the transfer from one denomination to that of a higher denomination.

A further object of the invention is to insure the correct registrations by preventing a too ready movement of the operating parts for effecting the registration.

A further object is to improve upon the construction set forth in the patents of J. H. McCormick, Nos. 570,141 and 610,365.

These general objects and others, auxiliary or subsidiary, which will appear hereinafter, are attained by the construction shown in the accompanying drawings, in which—

Figure 1 is a front elevation of the machine embodying our invention with the casing removed. Fig. 2 is a rear elevation of the same. Fig. 3 is a side or end elevation. Figs. 4, 5, 6, and 7 are transverse sectional elevations showing the arrangements of the various operating parts, which will hereinafter be more fully specified. Figs. 8 and 9 are detail views showing the adding and transferring devices. Fig. 10 is a detail view of the special or department keys and interlocking mechanism therefor. Fig. 11 is a transverse sectional view taken on the horizontal plane showing the arrangement of the special or department keys. Figs. 12, 13, and 14 are detail views of parts of the same. Figs. 15 and 16 are detail views of some of the printer operating devices.

Like parts are represented by similar characters of reference in the several views.

The main frame on which all the operating devices are supported consists, essentially, of end pieces $a\ a$, which are connected together by a series of rods or shafts, numbered, respectively from 1 to 8, and on which various parts of the mechanism are supported. This frame is placed within a casing; but for convenience the casing has been omitted from all of the views.

As in the other patents referred to a keyboard is provided at one end of the frame, the keys therein being arranged in series, as shown at $a'\ a^2\ a^3\ a^4$, each series being provided with nine keys numbered from 1 to 9, inclusive. The keys in each series are duplicates of those in the other series and all the keys are alike except in the length of the stems. They each consist, essentially, of a stem $b$, having at one end a button $b'$ and provided with a spring $b^2$ for holding the key in and returning it to its normal position. The keys of each series are all slidingly mounted in a curved frame $b^3$, which is supported at each end on the frame-rods 2 and 4. (See Fig. 6.) Each key has a laterally-projecting pin $b^4$, which projects through a slotted opening $b^5$ in the frame. As in the said patents referred to a swinging frame $c$ is employed opposite to the series of keys having on its periphery steps $c'$ to contact with the respective key-stems when the same are depressed, so as to determine the movement of said frame when released.

The projecting pins $b^4$ on the keys are each adapted to contact with a segment $d$, having beveled hook-shaped projections $d'$, which engage with said pins and retain them when depressed to the limit of their movement. A similar, but independent, segment $d^2$ is employed at the side of and adjacent to the segment $d$ and has similar beveled projections $d^3$, except that they are not hook-shaped. This segment $d^2$, which we will term the "plain" segment, is provided with a projection $d^4$, adapted to contact with one arm of a bell-crank lever $d^5$, the other arm of which is provided with a hook $d^6$ to engage a lug or projection $c^2$ on the swinging frame $c$, the bell-crank lever being mounted on the frame-rod 2. As a key is depressed the projection $b^4$, contacting with the beveled projections on each of the segments $d$ and $d^2$, moves said segments simultaneously about the rod 3, on which they are journaled. As soon as the key is depressed to its limit the segment $d$ returns by gravity to its normal position and engages the pin or projection on the key and holds it. The segment $d^2$, however, remains in the position to which it is forced by the depression of the keys and by its movement oscillates the bell-crank lever $d^5$ sufficiently to cause the hook $d^6$ to disengage the pin $c^2$ on the swinging frame $c$ and allow it to move until it contacts with the key which is depressed.

Each of the swinging frames $c$ has connected thereto a bar $c^3$, which extends across the frame and across the different series of registering devices to form intermediate actuating devices, which determine the amount to be registered.

On this machine the registering devices are arranged in groups or departments, which we have designated A, B, and C. Any number of these departments may be employed and may be used for keeping account of different classes of merchandise, of different character of sales, or the transactions of different salesmen. In the present drawings we have illustrated three of these departments as used, respectively, for cash sales, for sales charged, and for amounts paid out. If desired, an additional device may be employed which shall register the total of any number of departments desired, as in the former patents referred to; but such total-registering device is not deemed necessary in a machine such as illustrated here in view of the recording device which will be hereinafter described.

Each registering device consists of a series of toothed wheels $e \ e' \ e^2 \ e^3 \ e^4$, each adapted to register units, tens, hundreds, thousands, or any other denomination which may be required. In the present machine we have shown one hundred teeth in each registering-wheel and provided mechanism by which for every ten units registered on one wheel the wheel of the next higher denomination is moved one unit or notch.

Adjacent to each of the registering-wheels $e \ e' \ e^2 \ e^3 \ e^4$ is a pawl-lever $f$, journaled concentrically with the said registering-wheels on the rod 3 and carrying a pawl $f'$, which engages with the teeth in its adjacent wheel. Each of these pawl-levers $f$ is also provided with a projection $f^2$, the end of which is engaged by a swinging catch $f^3$, common to all the levers in the series, each of said swinging catches being journaled on the rod 4 and adapted to be turned on said rod by a key $f^4$, the stem of which is projected into proximity to said swinging catch. The pawl-levers $f$ are each further provided with a downwardly-projecting stem $f^{22}$, which normally rests on one of the actuating-bars $c^3$, the different pawl-levers for the different denominations in each series being in contact with a different bar and all the pawl-levers of the same denomination in the different series being in contact with the same bar.

Surrounding the bars $c^3$ when in their normal positions is a U-shaped frame $c^4$, the ends of which are perforated and journaled on the rod 3. This frame $c^4$ is provided at each end with perforated depending lugs $c^5$, through which is extended a rod $c^6$, which connects the two ends of said frame and also passes through pivoted levers $c^7$, of which there are two, one at each end of the series of registering-wheels, which are threaded on said rod and constitute, in effect, a part of said frame, said levers $c^7$ being extended downwardly and backwardly and normally rest on rollers $g \ g'$, journaled in suitable frames $g^2$, attached to the rear of the cash-drawer $h$. (See Figs. 2, 4, and 6.)

The depression of a key in any series on the keyboard releases a swinging frame, to which is attached the actuating-bar $c^3$, corresponding to the denomination of said series. By depressing one of the keys $f^4$, the pawl-levers of the registering device to which said key relates are unlocked by turning the swinging catch $f^3$. The bars $c^3$, however, are held in their normal position by the frame $c^4$, as each of said bars rests on the levers $c^7$, and these levers rest on the rollers $g \ g'$ of the cash-drawer. The rod $c^6$ of the frame $c^4$ is extended at one end beyond the frame-pieces $a$ and is connected by a link $c^8$ to an oscillating bar $c^9$, pivotally connected at each end to piston-rods $c^{10}$, the pistons of which operate in dash-pots $c^{11}$, which are filled with some suitable material to prevent the rapid movement of the pistons therein, and thus furnish a governor to control the movement of the frame $c^4$ in either direction. The bar $c^9$ is formed integral with a projecting stem $c^{12}$, having at the bottom a swinging pawl $c^{13}$, adapted as the bar is moved to travel along a ratchet $c^{14}$ and prevent the movement of said bar in one direction after it has started in the opposite direction until it has completed its movement and permitted the pawl to reverse at the end of the ratchet. A spring $c^{15}$, connected to the stem $c^{12}$ at one end and to the frame at the other, serves to move said bar when released.

Journaled on the frame-rod 4 is a U-shaped frame $f^5$, which extends under and in proximity to each of the swinging catches $f^3$. One end of this frame is extended beyond the rod 4 and is provided with a lug or projection $f^6$, which engages with the cash-drawer $h$ and locks the same. When either one of the keys $f^4$ is moved sufficiently to oscillate one of the swinging catches $f^5$, the frame $f^5$ is turned on the rod 4, so as to raise the lug or projection $f^6$ out of engagement with the drawer to permit the same to be opened by the aid of a spring $h'$ in the usual manner. (See Figs. 2 and 4.)

Connected to each of the bell-crank levers $d^5$ by a small link connection $d^7$ is an oscillating rod or shaft $d^8$, which extends longtiudinally across the greater portion of the machine (see Figs. 5 and 6) and is journaled in the bearings which support the department-keys $f^4$. These keys or their stems are each provided with a notch $f^7$, in which the shaft $d^8$ normally rests and normally prevents the movement of the key $f^4$. The shaft $d^8$, however, is provided with a notch $d^9$ opposite to the key, which when turned to a position in line with said key-stem permits said key-stem to be moved longitudinally. (See Fig. 13.) The movement of either of the bell-cranks produces the necessary movement of the shaft $d^8$ to unlock each of the department-keys $f^4$.

Extending from one department-key $f^4$ to the other is a series of short rods $f^8$, which meet when in the normal position over one or more of said keys and rest in a notch $f^9$ on one side of the key-stem. These rods are permitted sufficient movement to allow the separation of the rods over either one of the keys sufficient to disengage the notches $f^9$ from the ends of two of the rods; but when so separated all the other keys are locked, so that only one department-key can be moved at one time, and when one is moved another one may not be moved until the department-key is returned to its normal position. (See Fig. 12 for detail.)

Over each series of keys is an indicating-wheel $j$, having thereon a pinion $j'$, adapted to be engaged by a rack $j^2$. These indicating-wheels have on their peripheries numbers corresponding to the numbers of the keys of each series. The racks are each connected to an arm $j^3$, pivoted on the frame-rod 3 and resting normally in contact with a pin $j^{16}$ on one of the swinging frames $c$. Any movement of said frame, therefore, produces a corresponding movement of the indicating-wheel, and as the movement of said frame is determined by the key which is depressed the indicating-wheel will expose the number corresponding to said key, it being understood that these indicating-wheels are inclosed in a suitable casing having an opening through which the number thereon is displayed in the usual manner.

A key in one or more series on the keyboard having been depressed and followed by the depression of a department-key, the swinging or graduating frame $c$ of such series will be released and the drawer unlocked. As the drawer is unlocked it will be opened by the spring $h'$, and this will be followed by a movement of the frame $c^4$, the bar $c^3$, connected to such of the graduating-frames as have been released, and the pawl-levers $f$ of the department whose key has been depressed. The drawer being connected only to the spring $h'$ will be thrown open instantly. The other devices, however, being operated by the spring $c^{15}$ and the T-shaped bar to which the dash-pots or governor is attached will be moved more slowly and uniformly.

At the top of the machine adjacent to the indicating-wheels is a series of targets $k$, one for each department and each being adapted to be moved as the department-key is depressed. This is accomplished in the following manner: The swinging catch $f^5$ for each department is provided with a projecting arm $f^{10}$, having a lateral projection $f^{11}$, which engages with an angled arm $f^{12}$, formed on a sleeve $f^{13}$, which is journaled on the rod 4, the outer end of which is connected to a rod $f^{14}$, which leads to and is connected at its other end to one of the targets $k$. These targets, with the exception of one which will be hereinafter more fully referred to, are normally raised, so as not to be visible through the opening which will be formed in the casing. As a key is depressed the target corresponding to said key is brought to view by means of the connections described. The rods $f^{14}$ are each provided with a shoulder $f^{15}$, adapted as the rod is moved longitudinally to contact with a swinging plate $f^{16}$, which engages under said shoulder and holds the target in position before the opening. The raising of one rod will disengage any other rods which have been previously raised, so that in displaying one target those which were previously visible are moved out of sight.

To provide for locking the targets, so that they will not be changed while the drawer is open, we provide on each of the angled arms $f^{12}$ a pin $f^{17}$, and on the frame-rod 7 is journaled a sleeve $f^{18}$, from which is extended a series of hooks $f^{19}$, one for each target. A projecting finger $f^{20}$ on this sleeve contacts with the roller $g'$ on the drawer and holds said hooks normally out of engagement with said pins. As the drawer is opened, however, said finger is released and the sleeve is turned by a spring $f^{21}$, so as to engage said pins, and thus lock the targets until the drawer is again closed, so as to release them. (See Figs. 2 and 4.)

Prior to the time the drawer is opened any key on the keyboard may be depressed. The pressing of any key in one series will release any other key in that series which has been depressed by moving the hook-segment so as to release the pins on said key-stem. When the drawer is open, however, means are provided for positively locking all the keys in all the series. This is accomplished as follows: The hook-segments $d$ are each provided with an extended leg $d^{10}$, having at the end a foot $d^{11}$. Journaled on the shaft 6 (see Figs. 5 and 6) is a vibrating frame $d^{12}$, connected by a link connection $d^{13}$ to an oscillating lever $d^{14}$ on the shaft 7. This oscillating lever $d^{14}$ is held in a normal position by a spring $d^{15}$, but is capable of moving in either direction. A backwardly-extending projection $h^2$ on the drawer $h$ is adapted as the drawer is opened to contact with the lower end of the oscillating lever $d^{14}$, and thus draw the frame $d^{12}$ into contact with the legs $d^{10}$ on the hook-segments $d$, a pivoted hook $d^{16}$ on the rod 4 being adapted to engage the frame $d^{12}$ and hold it in contact with said legs $d^{10}$, and thus positively lock the hook-segments $d$. The end of the link $d^{13}$ where it connects with the oscillating lever $d^{14}$ is slotted, so that said lever is permitted to return to its normal position, while the oscillating frame $d^{12}$ remains in contact with the legs $d^{10}$. As the drawer is closed, therefore, the projection $h^2$ again contacts with the lever $d^{14}$ on the opposite side and moves it in the opposite direction. Now there is journaled on the rod 4 an oscillating frame $d^{17}$, which has a transverse bar $d^{18}$ extending across and under the feet $d^{11}$ on the legs $d^{10}$. A link $d^{19}$ connects the frame $d^{17}$ to the oscillating lever $d^{14}$ on the opposite side of the center from the connection on the link $d^{13}$, so that as said oscillating lever is moved by the closing of the drawer the frame $d^{17}$ is oscillated and raises the legs $d^{10}$, thus moving the hook-segments $d$ out of engagement with the pins on the key-stems. The swinging hook $d^{16}$ has an auxiliary arm $d^{20}$, which also rests in contact with the bar $d^{18}$ of the swinging frame $d^{17}$, so that the first movement of said frame causes the swinging hook $d^{16}$ to become disengaged from the U-shaped frame $d^{12}$, thus unlocking the hook-segments and permitting them to be moved back to disengage the keys as the drawer is closed. As soon as the projection $h^2$ passes the oscillating lever $d^{14}$ all the parts assume their normal position.

Whenever a key is depressed and the drawer opened, the amount is displayed by the indicating-wheels $j$. Means are provided by which these indicating-wheels are retained in position to show the last amount indicated thereby, even though the other parts are returned to their normal positions, which occurs as the drawer is closed, as will be more fully described hereinafter. The indicators are retained in any position to which they may be moved by a swinging plate $j^5$, which is adapted to engage with ratchet-teeth $j^6$ on the rack-bar $j^2$, which operates each of the indicating-wheels. Whenever a key is depressed, however, to register a succeeding amount, all the indicators are returned to their normal positions or to zero. This is accomplished through the following mechanism, which is best shown in Fig. 5: A spur $d^{21}$, beveled on the end, is formed on the plain segment $d^2$. The beveled end of this segment contacts with a rod or bar $d^{22}$ on a swinging frame $d^{23}$, which is journaled on the same shaft $j^7$ that carries the swinging plate $j^5$. A link $d^{24}$ is pivoted to the frame $d^{23}$, having a shoulder $d^{25}$. This link $d^{24}$ extends through a slotted opening $j^8$ in the swinging plate $j^5$. (See Fig. 5.) Whenever a key is depressed in the series, the movement of the plain segment by reason of the spur $d^{21}$ causes the frame $d^{23}$ to oscillate, and thus withdraws the swinging plate $j^5$ from contact with the ratchet-teeth $j^6$ in the rack-bars, allowing the indicating-wheels to return to zero, which they do by reason of a spring $j^9$, which connects the swinging arm $j^4$ with the extension of the swinging frame $c$. (See Figs. 5 and 6.)

Means are provided by which the drawer may be opened without operating either the department-keys or any of the keys in the keyboard, and when so operated all the indicating-wheels will be turned to the zero-point and the targets indicating the department in use also moved out of sight. To accomplish this, we provide a separate key, which we term the "change-key." This change-key, which is shown in Fig. 4, is a duplicate of the other department-keys $f^4$; but instead of operating against a swinging catch it contacts with a swinging plate $m$, journaled on the frame-rod 4 and resting above the swinging frame $f^5$, so as to operate the drawer-lock $f^6$ when depressed. Connected to a lug on the plate $m$ is a rod $m'$, the other end of which is connected to a lug on the bottom of the swinging plate $f^{16}$, so that as the plate $m$ is depressed the swinging plate $f^{16}$ is withdrawn from the shoulder $f^{15}$ on the target-rods $f^{14}$, which by reason of the weight of the rods and assisted by a spring, if desired, are moved away from the opening in the front of the casing through which they are displayed. These targets, which are preferably formed on the arc of a circle, each target being a little farther removed from the center of said circle than the other, are adapted to be moved in front of a stationary target $k'$, which is marked "Change" and is always in sight unless one of the department-targets is moved in front of it.

To provide for releasing the indicator-wheels when the drawer is opened by the change-key—that is to say, without operating a key on the keyboard—we employ a lever $m^2$, pivoted on a shaft $m^3$ and contacting at one end with a roller $g$ and at the other pivoted to a link $m^4$, which extends through a slotted opening $j^{10}$, Figs. 1 and 2, in the swinging plate $j^5$ and is provided with a shoulder $m^5$ to engage said plate, so that as the lever is oscillated, which occurs by gravity whenever the drawer is opened, the plate $j^5$ is moved to release the rack-bars connected to the indicator-wheels and permit them to return to their normal positions, or zero. (See Figs. 6 and 7.) Whenever the drawer is opened, therefore, all the indicator-wheels are released and return to their normal positions unless a key on the keyboard has been depressed to release the intermediate actuating mechanism for the registering devices, which in that case would move with the opening of the drawer and carry the indicating-wheels to the proper position, as before explained.

To provide against the overrunning of the indicating-wheels to cause them to stop at the proper point when moved by the intermediate actuating devices, we construct on the end of each of the arms $j^3$ a curved extension $j^{11}$, which normally rests in contact with a swinging stop-lever $j^{12}$, pivoted to the vibrating frame $c$ on the opposite side of the rod 3 from the arm $j^3$. When a swinging frame $c$ moves, therefore, this arm $j^3$ moves positively therewith, being connected thereto on opposite sides of the center of movement. When the actuating mechanism is returned to its normal position by the closing of the drawer, the swinging stop-lever $j^{12}$ is moved out of contact with the extension $j^{11}$, so that the actuating devices may return to the normal position, while the indicators are left in a position to indicate the amount last registered. This is accomplished by rocking the shaft $m^3$ to cause an arm $m^6$ thereon to engage with the stop-lever $j^{12}$ and move it out of contact with the extension $j^{11}$. The proper movement is imparted to the shaft $m^3$ through the medium of connecting-rods $m^7$ $m^8$ and a bell-crank lever $m^9$ from an oscillating lever $m^{10}$, journaled on the rod 4. This lever $m^{10}$ stands in line with one of the levers $c^7$, so that when it drops on the opening of the drawer the oscillating lever $m^{10}$ is moved so as to rock the shaft $m^3$, and thus turn the stop-lever $j^{12}$ until the pivoted latch $j^{13}$ thereon engages on a projection $j^{14}$ on the actuating device $c$. A spring $j^{15}$ returns the stop-lever $j^{12}$ to its normal position when released by the catch $j^{13}$, which is accomplished by returning the shaft $m^3$ to its normal position by the movement of the bell-crank lever $m^9$, caused by the contact of a spur $m^{11}$ thereon with the roller $g$ as the drawer is closed. (See Fig. 6.)

A loose connection is established between the drawer and the intermediate actuating devices through the medium of a slide $n$, (see Figs. 2, 3, 15, and 16,) which is supported in a suitable bearing on one of the end pieces $a$ of the frame and is provided on one side with lugs $n'$ $n'$ and on the other side with a single lug $n^2$. The lugs $n'$ $n'$ are adapted to rest on opposite sides of the arm $c^{12}$, connected to the actuating devices, while the lug $n^2$ is adapted to contact with the rear end of the drawer $h$. As the drawer opens it moves independently of the actuating devices, as before described. As the drawer closes the actuating devices are moved thereby through the agency of the slide $n$ just described. The dash-pots which constitute the governor prevent the rapid movement of the actuating devices in either direction, while the drawer is permitted to open rapidly. In closing, however, the speed of the drawer also is limited by the governor, so that all danger of disarranging any of the parts and the wear subject to sudden jar in operating the actuating devices quickly is prevented.

It will be understood from the above that the actuating devices which are released when the drawer is opened are returned to their normal position when the drawer is closed and carry therewith all the pawl-levers which have been released by the department-keys, and thus register the amounts which have been indicated by pressing any of the keys on the keyboard.

To provide for transferring an amount on the registering-wheel of one denomination to that of a higher denomination whenever a certain number of units of said denomination has been registered to make up a unit of the next higher denomination, we construct on each of the registering-wheels, except the highest in the series, auxiliary teeth $e^5$ opposite every tenth tooth in the registering-wheel. These teeth $e^5$ are adapted to contact as the wheel revolves with a spring-actuated pivoted lever $e^6$, the opposite end of which engages with a pin $e^7$ on a pivoted catch $e^8$, which engages a pawl $e^9$, arranged opposite to the registering-wheel of the next higher denomination, said pawl and catch lever being connected together by a spring $e^{10}$. The pawl $e^9$ and the catch $e^8$ are each pivoted to a lever $e^{11}$, which is journaled on the rod 3 and has a backwardly-extending spur $e^{12}$. One of these levers $e^{11}$ is employed for each wheel, except the highest denomination, and each one is connected to one arm of a rock-shaft $e^{13}$ in the nature of a sleeve, each of which has at one end a lug $e^{14}$, which lugs are all arranged in the same plane.

Pivoted on the shaft 3 at a convenient point in its length is a sleeve $o$, which has two projecting arms or prongs $o'$ $o^2$. The arm $o'$ is connected to one end of a spring $o^3$, the opposite end of which is connected to the frame rod 7. (See Figs. 6, 7, and 8.) To the prong $o^2$ is hinged an arm $o^4$, which is connected to said arm so as to move therewith when the same is turned with the sleeve $o$, but is permitted a slight lateral movement against the spring $o^3$. This hinged arm $o^4$ stands normally in line with the lugs $e^{14}$ on the respective rock-shafts $e^{13}$ and is adapted to contact successively therewith and produce a slight movement of said rock-shaft when the arm is released and actuated by the spring $o^3$. The end of the arm $o^4$ and the rear of the lugs $e^{14}$ are beveled to permit the arm $o^4$ to be turned to its normal position without moving said rock-shaft, the arm in this case being moved laterally, so as to pass said lugs. The arm $o^2$ has pivoted thereon a hook-shaped catch-lever $o^6$, having thereon a spur $e^7$. One of the bars $c^7$ has a spur $c^{16}$, on which is a pin $c^{17}$, with which the hook-lever $o^6$ is adapted to engage. Journaled on the frame-rod 5 in line with the spur $o^7$ is an oscillating lever $o^8$, connected by a link $o^9$ to the arm $o^{10}$ of a rock-shaft $o^{11}$, which has a projecting plate $o^{12}$, which stands in line with the projections $e^{18}$ of each of the pawls $e^9$. The lever or arm $o^2$ is normally drawn down to the limit of its stroke by the spring $o^3$. When the actuating devices are released by the opening of the drawer, the pin $c^{17}$ on the spur $c^{18}$ becomes engaged by the tooth-lever $o^6$ and connects said arm $o^2$ to the actuating devices, so that as the drawer is closed said arm is moved with said actuating devices, thus elongating the spring $o^3$. As soon as the actuating devices have returned to their normal positions, thus completing the movement of each of the registering-wheels, the arm $o^4$ is released by the contact of the spur $o^7$ with the oscillating lever $o^8$, which withdraws the catch-lever $o^6$ from the projection $c^{17}$. The arm $o^2$, with its hinged auxiliary $o^4$, is caused then to move so as to successively contact with the lugs $e^{14}$ and through the rock-shaft $e^{13}$ impart successive impulses to the levers $e^{11}$, which carry the pawls $e^9$, this impulse being sufficient to produce a movement of those registering-wheels with which the pawls are engaged equal to one notch or one unit.

The registering-wheels are each prevented from moving backwardly by the pawls $e^{16}$, pivoted on the frame-rod 1. Each of these pawls is provided with a spur $e^{17}$, which is in line with the pawl $e^9$ on the lever $e^{11}$ and is so arranged with reference to said pawl that as the lever $e^{11}$ is moved forward each of the pawls $e^9$ which are engaged with the registering-wheel will come in contact with a spur $e^{17}$ as soon as the registering-wheel has been advanced one notch or unit. The end of the pawl $e^9$ is slightly beveled, so that this contact with the spur $e^{17}$ forces the pawl $e^{16}$ more firmly in contact with the teeth of the wheel and also wedges the pawl $e^9$ in contact with said teeth, so that the wheel is thus positively stopped when moved one tooth and locked in this position so long as the pawl $e^9$ remains in contact with the spur $e^{17}$. The parts are returned to their normal positions as soon as the operation is completed through the agency of a spur $o^{13}$, which as the lever $o^2$ reaches the limit of its stroke contacts with the vibrating lever $o^8$, causing the same to vibrate so as oscillate the shaft $o^{11}$ to bring the plate $o^{12}$ in contact with the spur $e^{15}$ of the pawls $e^9$, thus raising said pawls out of engagement with the wheels and until they are engaged by the spring-actuated catch-levers $e^8$. The rock-shafts being arranged in successive order produce a successive movement of the adding-levers—that is to say, the lowest denomination is operated first and the highest last—so that the entire amount registered on one wheel will be carried forward to the next higher, the movement of one registering-wheel being sufficient to make a unit of the next higher. The adding or transferring device being operated after the registration of the actuating device is complete, the registration of either of the wheels cannot in any way affect the accuracy of the transferring of the amount from one wheel to another.

From the above description it will appear that any amount which may be indicated on the keyboard may be registered in any of the series of registering devices.

To further provide for recording in detail the respective transactions indicated by the indicator and registered on the registering devices, we employ a printing device for each registering device in connection with suitable rollers on which is placed a strip or strips of paper. This is accomplished in the following manner: In front of the casing and immediately over the drawer is a rock-shaft $p$, on which are secured supporting-arms $p'$ at or near each end. Between these arms and adjacent to each is a plate $p^2$, which has a central trunnion $p^3$, which is journaled in the end of each of said arms. These end plates $p^2$ are connected together by rod $p^4$, which extend from one plate to the other, thus forming a supporting-frame in which are three rollers $p^5 p^6 p^7$. Each of these rollers is journaled at each end in end plates $p^2$, the one, $p^7$, being supported at each end in a slotted opening $p^8$. Pivoted to one of the plates $p^2$ is a hook-shaped lever $p^9$, which engages normally in a notch $p^{10}$ in the cash-drawer $h$ when said drawer is closed. A spring $p^{11}$, connected from the frame to the hook-shaped lever $p^9$, tends to keep said arm in engagement with the drawer and also to turn the roller-frame upon the trunnion $p^3$. When the drawer is closed, the notch $p^{10}$, engaging with the hook-lever $p^9$, turns the roller-frame to the position shown in Fig. 6, with the roller $p^6$ opposite an opening $p^{12}$ in the top of the front part of the casing. When the drawer is opened and the hook-shaped lever released from the notch $p^{10}$, the spring $p^{11}$ turns the roller-frame until the roller $p^6$ occupies a position substantially at right angles to the position previously occupied, as shown in Figs. 7 and 15.

Immediately in the rear of the roller-frame is a number of printing-wheels $r$, one for each registering-wheel, said printing-wheels being arranged in groups, one group for each registering device. The printing-wheels of each group are all journaled on a shaft $r'$, supported at each end by swinging arms $r^2$, which are pivoted or hinged to the frame-rod 2. Each of the printing-wheels $r$ has on one side thereof a drum $r^3$, within which is located a spiral spring $r^4$, one end of which is connected to the drum and the other to the shaft $r'$, on which the wheel is mounted. About the drum is wound a cord or cable $r^5$, which, passing over a supporting-pulley $r^6$ on the frame-rod 2, is connected to the pawl-lever $f^2$, one of said printing-wheels being thus connected to each of said pawl-levers. Whenever a pawl-lever, therefore, moves any distance around the registering-wheel, the printing-wheel is moved the same distance. Each of the printing-wheels has on its face numbers from "1" to "9" and a "0," the zero being always normally toward the roller-frame. The limit of the pawl-lever is nine notches on the registering-wheel. This movement is sufficient to turn the printing-wheel nine spaces, so that for every notch which the pawl-lever is moved a corresponding number on the printing-wheel is brought forward to take the place of the normal zero.

Extending backwardly from each series or group of printing-wheels is a push-bar $r^7$, which has an I-shaped spur $r^8$, adapted to normally rest in contact with a plate $r^9$ on the rock-shaft $d^8$, which locks the department-keys in the manner heretofore described. (See Fig. 13.) These push-bars $r^7$ are continued to a point adjacent to the frame-rod 6 and are bifurcated at their rear end, and within the fork thus formed is a shoulder $r^{10}$, which is adapted under certain conditions to engage with a spur $r^{11}$, secured to said frame-rod 6. A sleeve $r^{12}$, also journaled on the rod 6, carries on each side oppositely-arranged projections $r^{13}$ and $r^{14}$, the one, $r^{14}$, being adapted to contact with the extremity of one of the fork portions of the push-bar $r^7$, the other being in line with a stud $r^{15}$ on the key-stems $f^4$ for each of the department or registering devices. If one of the keys $f^4$ therefore is depressed, the stud $r^{15}$, contacting with the projection $r^{13}$ on the sleeve $r^{12}$, moves the push-bar $r^7$ forwardly, carrying with it the series of printing-wheels corresponding to that department. Now if a key has been depressed on the keyboard the plate $r^9$ on the rock-shaft $d^8$ will be turned downwardly, releasing the spur $r^8$ on the push-bar. The rear end of the push-bar will therefore be permitted to drop with the shoulder $r^{10}$ in contact with the end of the spur $r^{11}$, thereby holding the push-bar in its changed position until released.

Immediately in front of the series of printing-wheels, extending substantially across the frame, is an ink-roller $s$. (See Figs. 4, 5, and 6.) This roller $s$ is journaled at each end in a frame $s'$, which in turn is pivoted at each end, as shown at $s^2$, to hinged bars $s^3$ from the frame-rod 2. This ink-roller $s$ normally stands in front of all the printing or type wheels and between said wheels and the roller-frame. The frame $s'$, however, is connected by a link $s^4$ to one of the end plates $p^2$ of the roller-frame, and as said roller-frame is turned on its trunnions, as before described, it turns the frame $s'$ on its trunnions $s^2$, thus moving said ink-roller downwardly and around the printing-wheels. The printing-wheels normally stand back of the ink-roller and contact therewith only when pushed forward by the operation of one of the department-keys, as before described, and when so advanced the ink-roller turns in contact with the type on said printing-wheels as they are revolved to their position. The ink-roller will further contact with the type in rolling away from its normal position as the roller-frame is turned on its trunnions, so that all the type on the printing-wheels which are advanced will be inked.

On each of the pivoted arms $p'$ is a downwardly-extending lug $p^{13}$, which normally stands in line with the slide $n$, connected to the intermediate actuating devices of the register. As said actuating devices approach the limit of their first movement after the opening of the drawer the end of the slide $n$ contacts with the lug $p^{13}$, and thus oscillates the rock-shaft $p$, carrying with it the roller-frame and bringing the roller $p^5$ into contact with all those printing-wheels which have been advanced, as before described. It should be stated that the roller $p^5$ contains a strip of paper preferably wide enough to extend across the entire series of printing-wheels, although separate strips for each group may be employed, if desired. This strip passes over and partly around the roller $p^6$ and is rewound on the roller $p^7$, so that at each movement of the roller-frame against the type-wheels an impression is made from all those type-wheels which have been advanced, thus recording the exact amount which is registered in the department to which said printing-wheels belong. Means are provided for moving the paper a uniform distance each time the roller-frame is moved, which occurs each time the cash-drawer is opened, so that the arrangement of the numbers in the column representing the different groups of printing-wheels will show exactly the transactions registered on each registering device and in the order in which they occur. The movement of the paper is accomplished as follows: The roller $p^6$ is provided at one end with a ratchet-wheel $p^{14}$, which when the said roller is turned toward the printing-wheels engages with a lug or projection on a spring-actuated arm $p^{15}$, which is hinged to one of the arms $p'$, this lug being shown in Fig. 16. As the roller-frame returns to its normal position, turning on the trunnion $p^3$, this lug engages with the ratchet-wheel and moves said roller sufficient to advance the paper to the proper distance. As the roller-frame revolves one of the bars $p^4$ in the frame contacts with a shoulder $p^{16}$ on the lever $p^{15}$, which moves said lever so as to disengage its lug from said ratchet-wheel when the roller has been turned the proper distance.

It should be stated that the roller $p^7$, on which the paper is wound and which is journaled in the slotted openings $p^8$ at each end, is pressed firmly between the rollers $p^5$ $p^6$ by a spring $p^{17}$, (see Fig. 5,) forming, as it were, an intermediate roller contacting with both of the other rollers and moved thereby. As the diameter of the roller $p^5$ decreases by withdrawing the paper therefrom that of the roller $p^7$ increases. The slotted opening permits the proper movement of the roller $p^5$ to compensate for this change in its diameter, so that it remains at all times in contact with each of the rollers $p^6$ and $p^7$. The roller $p^6$ will be covered with some suitable material to receive the impression of the type-wheels and also to supply the proper friction to move the paper when said roller is turned. A spring $p^{19}$, extending from the casing to the arms $p'$, serves to return the roller therefrom to its normal position, which is determined by a stop $p^{18}$, secured to the end frame and adapted to contact with said pivoted arm.

It will be noticed that the rollers are extended considerably beyond the printing-wheels, so that if the paper on said rollers is of a width equal to the length thereof a margin will be left on one edge of the paper. This margin is adapted to come under the opening $p^{12}$ in the front of the casing and will furnish the necessary space to write in the names of individuals to whom amounts are to be charged or any other remarks which may be desirable in connection with transactions registered and recorded.

In Fig. 10 we have shown the arrangement of the printing device for the change-key. It differs from the other devices in that it has only a single printing-arm $t$, on which is carried a zero. An L-shaped spur $t'$ on the push-bar $r^7$ is arranged on the opposite side of the shaft $d^8$ from those of the printing-wheel to coöperate with the plate $t^2$ on said shaft, so that the change-printing device is locked if either of the other department devices is unlocked, and vice versa. The printing device connected with the change-key therefore operates only at such times as the drawer is opened without the depression of any other key. If any other key is depressed, then the change-key and the printing device are locked. Whenever the drawer is opened, therefore, without the recording or registering of any transaction, a simple zero is printed in the column opposite to the change-key, so that a mark appears on the recording-strip every time the drawer is opened, thus furnishing a complete record in detail of every operation performed on the machine during any period of time.

Having thus described our invention, we claim—

1. A series of keys, and an indicator having numbers corresponding to each key, a rack-bar adapted to operate said indicator, and a pivoted lever attached to said rack-bar, an intermediate pivoted actuating device having on opposite sides of its pivotal center projections to engage said pivoted lever, one of said projections being stationary and the other movable, a movable part, such as a cash-drawer, for returning said actuating device to its normal position, and a connection from said movable part to the movable projection on said actuating device whereby said movable projection may be disengaged from said pivoted lever to permit the actuating device to return to its normal position while the indicator remains, substantially as specified.

2. The combination with a series of keys, and an intermediate actuating device, an indicating-wheel, a pivoted lever connected to said wheel so as to move therewith, said pivoted lever being normally connected to said actuating device on opposite sides of the pivotal center, and means as described for disengaging said pivoted lever on one side of its pivotal center when the actuating device is returned to its normal position, and a catch for retaining said indicator in the position to which it is moved by said actuating device, substantially as specified.

3. A series of keys, an intermediate actuating device, and a movable part, such as a cash-drawer, adapted by its movement to operate said actuating device, means for unlocking and determining the movement of said actuating device when a key is depressed, an indicating-wheel having a series of numbers corresponding to the number of keys, and a pivoted lever connected to said wheel, a connection from said actuating device to said pivoted lever on opposite sides of its pivotal center, a catch for retaining said indicating-wheel in the position to which it is moved by said actuating device, and means as described for disengaging the pivoted lever from said actuating devices on one side of the pivotal center when said actuating device is returned to its normal position, substantially as specified.

4. A series of keys arranged in groups, an intermediate actuating device for each group, and a registering-wheel for each actuating device, a pawl-lever having a pawl to engage with each of said registering-wheels and adapted to move with said actuating device, means connected with each of said keys for unlocking and determining the movement of the actuating device belonging to its series or group, and a movable part, such as a cash-drawer, to cause said actuating device to move to a predetermined distance and return to its normal position, transferring-pawls adjacent to each of said registering-wheels except the lowest in denomination, and means for engaging said transferring-pawls with said registering-wheel by a predetermined movement of the registering-wheel of the next lowest denomination and a spring-actuated lever adapted to be released when said actuating mechanism is returned to its normal position and to successively actuate said pawl-levers so as to move their respective registering-wheels a limited distance, substantially as specified.

5. In a cash-register, a series of registering-wheels, each representing a different denomination, means for independently actuating each of said registering-wheels to register units corresponding to the denomination of said wheel, pawl-levers for each of said registering-wheels except the lowest in denomination, said pawl-levers being adapted to be operated by a predetermined movement of the wheel of the next lower denomination to cause the pawl to engage with its registering-wheel, a series of rock-shafts each having a projecting finger and each connected to one of said pawl-levers, a spring-actuated lever adapted when released to contact with all of the fingers on said rock-shafts, and means for releasing said spring-actuated lever when the registering-wheel of any denomination has completed its movement, substantially as specified.

6. In a cash-register, registering devices and cash-keys, for determining the movement thereof, a cash-drawer connected to said registering devices so as to actuate the same by the movement of said cash-drawer, and a governor connected to said drawer and to said registering devices, said governor being adapted to insure a uniform speed of the same during its entire return movement and further adapted to regulate the speed of the registering devices, substantially as specified.

7. A cash-register having a normally closed cash-drawer and a connection from said drawer to the registering devices, a pivoted bar connected to said registering devices, and a speed-regulator connected to said bar, for causing the speed of said drawer to be uniform during its entire movement, and means on said bar to prevent the closing of said drawer after the operation of opening the same is begun, substantially as specified.

8. In a registering-machine, a plurality of indicators, a movable frame for each indicator, connections between each indicator and its frame for moving the indicator by the frame, and means for locking and unlocking said connections and frame.

9. In a registering-machine, a plurality of indicators, a movable member for each indicator, connections between each indicator and its member, means for locking each of said connections to its respective member when said members are moving in one direction, and means for unlocking said connections and members when the latter are moving in the opposite direction.

10. In a registering-machine, an indicator, a pivoted frame, connections between said indicator and frame, a pivoted latch on said frame for engaging and locking said connections to the frame while it is moving in one direction, and means for shifting said latch to unlock said connections from the frame so that the latch may move independently in the opposite direction.

11. In a registering-machine, a drawer, an indicator, a pivoted frame, a connection between said indicator and frame, a pivoted latch on said frame for engaging and locking said connection to the frame while it is moving in one direction, and means operated from the drawer for shifting said latch to unlock said connection from the frame so that the latter may move independently in the opposite direction.

12. In a cash-register, the combination with a register, of operating-levers for the same, an indicating device, an operating-lever for said indicating device, a movable locking device mounted on said former lever to lock into the last-mentioned lever, and a tripping means for actuating said locking device.

13. In a cash-register of the class described the combination with a registering mechanism, of pivoted operating devices for the same, an indicating device, operating-levers for said indicating device, and means for positively connecting the operating-levers and the pivoted operating devices whereby they are locked together upon the downward movement but released upon the upward movement.

14. In a cash-register, a registering device, a special key, means for maintaining the register out of operation when the key is actuated, a special indicator under the control of the special key, a bar for turning the indicator, said bar having a shoulder, and a plate for engaging said shoulder and holding the indicator in set position between operations of the machine.

15. In a cash-register, a drawer, an indicator, a pivoted frame, connections between said indicator and frame, a pivoted latch on said frame for engaging and locking said connections to the frame while it is moving in one direction and means operated from the drawer for shifting said latch to unlock said connections from the frame so that the latter may move independently in the opposite direction.

16. In a cash-register, an indicator, a pivoted frame, connections between said indicator and frame, a pivoted latch on said frame for engaging and locking said connections to the frame while it is moving in one direction, and means for shifting said latch to unlock said connections from the frame, so that the latter may move independently in the opposite direction.

17. In a cash-register, a series of registering-wheels, operating mechanism therefor, a transfer-pawl for each of said wheels except the one of lowest denomination, a rock-shaft for each of said pawls, said shafts being arranged successively one in advance of the other, and means for rocking said shafts to effect the transfer immediately after the movement of the operating mechanism has been substantially completed.

18. In a registering mechanism, a series of registering-wheels, operating mechanism therefor, transfer-lugs on said wheels, pawl-carriers mounted coaxially with the wheels, pawls on said carriers, means for normally holding said pawls out of engagement with their corresponding wheels, means controlled by said lugs for causing the pawls to drop into engagement with their wheels, and means for successively moving said pawl-carriers so that those pawls which have been dropped will move their wheels to effect a transfer, said movement of the wheels taking place immediately after the movement of the operating mechanism has been substantially completed.

19. In a cash-register, a series of registering-wheels, operating mechanism therefor, a pawl for each of said wheels except the one of lowest denomination, means for normally holding said pawls out of operative position, lugs on said wheels for causing said pawls to drop into operative position, means for moving said pawls, and a rock-shaft provided with means for lifting said pawls back out of operative position, said movement and lifting of the pawls taking place immediately after the movement of the operating mechanism has been substantially completed.

20. In a cash-register, a series of registering-wheels, operating mechanism therefor, lugs on said wheels, pawl-carriers pivoted coaxially with said wheels, pawls on said carriers, means for holding said pawls out of operative position, means controlled by said lugs for dropping the pawls into operative position, rock-shafts connected with said pawl-carriers, means for successively rocking said rock-shafts to move said pawl-carriers, and another rock-shaft provided with means for restoring said pawls to their original positions, said rock-shafts being moved after the movement of the operating mechanism has been substantially completed.

21. In a cash-register, a series of registering-wheels, operating mechanism therefor, transfer-lugs on said wheels, transfer-pawls, means for normally holding said pawls out of engagement with their respective wheels, means operated by said lugs for causing said pawls to drop into engagement with their wheels, a rock-shaft for each pawl, and means for rocking said shafts to move the pawls and to cause those pawls that are dropped to move their respective wheels, said movement of the wheels taking place immediately after the movement of the operating mechanism has been substantially completed.

22. In a cash-register, a series of registering-wheels, an operating mechanism therefor, a series of transfer-pawls for said wheels, a series of rock-shafts for moving said pawls, another rock-shaft for disconnecting said pawls from said wheels, and a common means for successively rocking all of said shafts, said movement of the shafts taking place after the movement of the operating mechanism has been substantially completed.

23. In a cash-register, an indicator, a rack-bar for rotating said indicator, means for moving said rack-bar, a latch for holding said rack-bar and indicator from overthrowing a cash-drawer, means controlled by said drawer for disengaging the latch, and a rock-shaft for tripping said means and permitting the same to again engage and hold the rack.

24. In a cash-register, an indicator, means for operating said indicator, a latch engaging said means and holding the indicator from overthrowing, means for withdrawing the latch and releasing the indicator, and means for tripping the latch so that it may again engage the operating means.

25. In a cash-register, the combination with an operating mechanism, of a series of amount-keys, a series of special keys normally inoperative in connection with the operating mechanism, a change or "No-sale" key normally operative and means operated by the amount-keys for rendering the special keys operative and the "No-sale" key inoperative.

26. In a cash-register, the combination with an operating mechanism, of a series of amount-keys, a cash-drawer, a drawer-latch, a series of special keys normally inoperative in connection with said latch, a change or "No-sale" key normally operative in connection with said latch, and means operated by the amount-keys for rendering the special keys operative and the "No-sale" key inoperative in connection with the latch.

27. In a cash-register, the combination with an operating mechanism, of a series of amount-keys, a cash-drawer, a special key controlling said drawer, and means operated by the amount-keys for rendering the special key inoperative, in relation to the drawer.

28. In a cash-register, the combination with an operating mechanism, of a series of amount-keys, a cash-drawer, a change or "No-sale" key for opening said drawer, a special indicator for said key, and means operated by the amount-keys for rendering the change or "No-sale" key inoperative in connection with the cash-drawer and indicator.

29. In a cash-register, the combination with an operating mechanism, means for normally holding said mechanism against operation, a key for releasing said mechanism, and a printing device set by the operation of the release-key.

30. In a cash-register, the combination with an operating mechanism, a cash-drawer by means of which said mechanism is operated, a "No-sale" key for opening said drawer and a printing device controlled by said "No-sale" key.

31. In a cash-register, in combination with an operating mechanism, of a series of amount-keys, a series of special keys, normally inoperative in connection with the operating mechanism, a change or "No-sale" key normally operative, means operated by the amount-keys for rendering the special keys operative and the "No-sale" key inoperative, and a printing device controlled by the "No-sale" key.

32. In a cash-register, the combination with an operating mechanism, of a series of amount-keys, a cash-drawer, a drawer-latch, a series of special keys normally inoperative in connection with said latch, a change or "No-sale" key normally operative in connection with said latch, means operated by the amount-key for rendering the special keys operative and the "No-sale" key inoperative in connection with the latch, and a printing device under control of the "No-sale" key.

33. In a cash-register, the combination with an operating mechanism, of a series of amount-keys, a cash-drawer, a special key controlling said drawer, means operated by the amount-keys for rendering the special key inoperative in relation to the drawer, and a printing device controlled by said special key.

34. In a cash-register, the combination with an operating mechanism, of a series of amount-keys, a cash-drawer, a change or "No-sale" key for opening said drawer, a special indicator for said key, means operated by the amount-keys for rendering the change or "No-sale" key inoperative in connection with the cash-drawer and indicator, and a printing device under control of the "No-sale" key.

In testimony whereof we have hereunto set our respective hands this 19th day of September, A. D. 1905, and the 28th day of September, 1905.

JOHN H. McCORMICK.
JAMES D. MORRISON.

Witnesses for John H. McCormick:
 WM. B. SCHLEY,
 LEOTA McCORMICK.

Witnesses for James D. Morrison:
 S. E. FOUTS,
 THOS. B. ECKLOFF.

---

It is hereby certified that Letters Patent No. 810,377, granted January 16, 1906, upon the application of John H. McCormick, of Columbus, Ohio, and James D. Morrison, of Washington, District of Columbia, for an improvement in "Cash Registers and Indicators," were erroneously issued to said McCormick and Morrison as owners of said invention; whereas said Letters Patent should have been issued to *The International Register Company, of Columbus, Ohio, a corporation of Ohio*, said company being owner by mesne assignments of the entire interest, as shown by the record of assignment in this office; and that the said Letters Patent should be read with this correction therein that the same may conform to the record of the case in the Patent Office.

Signed and sealed this 6th day of February, A. D., 1906.

[SEAL.]

F. I. ALLEN,
*Commissioner of Patents.*